United States Patent Office 3,407,256
Patented Oct. 22, 1968

3,407,256
PSYCHOTHERAPEUTIC COMPOSITIONS OF N[(4,4-SUBSTITUTED PIPERIDINO) LOWER ALKYL] IMINODIBENZYL COMPOUNDS
Michio Nakanishi, Natatsu, Oita, and Tomohiko Munakata, Yoshitomimachi, Chikujo-gun, Fukooka, Japan, assignors to Yoshitomi Pharmaceutical Industries, Ltd., Osaka, Japan
No Drawing. Original application May 20, 1964, Ser. No. 369,013, now Patent No. 3,329,683, dated July 4, 1967. Divided and this application Feb. 27, 1967, Ser. No. 632,863
Claims priority, application Japan, May 23, 1963, 38/26,966; July 2, 1963, 38/34,867
5 Claims. (Cl. 424—267)

ABSTRACT OF THE DISCLOSURE

Compositions containing, as active ingredient, a compound of the formula

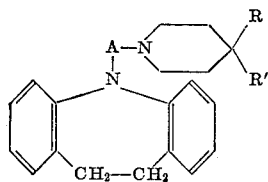

or a pharmaceutically acceptable acid addition salt thereof, wherein A is alkylene of 1 to 4 C atoms, R is H, OH, alkoxy with up to 5 C atoms, cyano, carbamoyl, aminomethyl or acylaminomethyl (the acyl being acyl of carboxylic acid with up to 7 C atoms), and R' is phenyl, halophenyl, methylphenyl, halomethylphenyl, or

wherein Q and Q' together with the adjacent N collectively represent a heterocyclic group, are useful in the therapy of schizophrenia.

---

This application is a division of copending application, Ser. No. 369,013, filed May 20, 1964 (now U.S. Patent No. 3,329,683, granted July 4, 1967).

This invention relates to therapeutically useful compositions containing, as active ingredient, novel and useful iminodibenzyl derivatives.

The iminodibenzyl derivatives of this invention are represented by the following general formula:

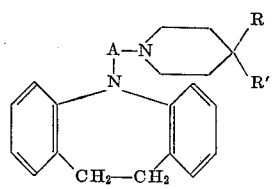

wherein A represents an alkylene group having from 1 to 4 carbon atoms; R represents hydrogen atom, hydroxyl group, alkoxy group having up to 5 carbon atoms, cyano group, carbamoyl group, aminomethyl group or acyl aminomethyl group (the acyl being carboxylic acyl having up to 7 carbon atoms), and R' represents a phenyl group, a phenyl group substituted with one or more of halogen, methyl and halomethyl, or

group, in which each of Q and Q' together with the adjacent nitrogen atom collectively represent a heterocyclic group.

It was found that these Compounds (I) show a remarkable effect in the therapy of chronic schizophrenia, the therapy of which has generally been thought to be quite difficult.

It is a principal object of the present invention to provide pharmaceutical compositions which comprise at least one of the aforesaid iminodibenzyl derivatives which have made it possible to treat chronic schizophrenia, the therapy of which has heretofore been regarded as difficult.

Compounds (I) are prepared by allowing a compound represented by the Formula II

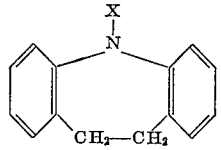

to react with a compound represented by the Formula III

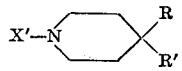

wherein R and R' have respectively the same meaning as in the Formula I, and one of X and X' represents hydrogen atom and the other represents —A—Y group, in which Y is a halogen atom (i.e. fluorine, chlorine, bromine, and iodine) or sulfonyloxy group having from 1 to 7 carbon atoms (e.g. methanesulfonyloxy, ethanesulonyloxy, benzenesulfonyloxy and toluenesulfonyloxy), and A has the same meaning as in the Formula I. In the above Formula I, II and III, the alkylene group represented by A may be of straight chain or branched, and examples thereof are ethylene, trimethylene, 1- or 2-methylethylene, tetramethylene, 1- or 2- or 3-methyl-1,3-propylene or 1- or 2-ethylethylene. The alkoxy groups represented by R may be, for example, methoxy, ethoxy, propoxy, isopropoxy, and butoxy. When R represents an acylaminomethyl group, the acyl is exemplified by acetyl, propionyl, butyroyl and benzoyl. When R represents

group, each of Q and Q' may be an alkyl (e.g. methyl, ethyl, propyl, isopropyl, butyl, pentyl and cyclohexyl) or Q and Q' may form together with the adjacent nitrogen atom a five- or six-membered heterocyclic group (e.g. piperidino, pyrrolidino, 4-methylpiperazino and morpholino). When X represents the group —A—Y, the Compound (II) may, for example, be N-(3-chloropropyl)iminodibenzyl
N-(3-bromopropyl)iminodibenzyl
N-(3-methanesulfonyloxypropyl)iminodibenzyl
N-(3-benzenesulfonyloxypropyl)iminodibenzyl
N-(2-chloropropyl)iminodibenzyl
N-(2-ethanesulfonyloxypropyl)iminodibenzyl
N-(2-methyl-3-chloropropyl)iminodibenzyl and the Compound (III) represents 4-substituted piperidine such as 4-carbamoyl-4-dimethylaminopiperidine
4-carbamoyl-4-(4-methylpiperazino)piperidine
4-carbamoyl-4-piperidinopiperidine
4-piperidinopiperidine
4-pyrrolidinopiperidine
4-cyano-4-phenylpiperidine
4-carbamoyl-4-morpholinopiperidine
4-hydroxy-4-(4-chlorophenyl)piperidine
4-hydroxy-4-phenylpiperidine
4-hydroxy-4-(3-trifluoromethylphenyl)piperidine
4-hydroxy-4-(4-methylphenyl)piperidine
4-phenyl-4-acetamidomethylpiperidine
4-methoxy-4-(4-chlorophenyl)piperidine.

On the other hand, when X' represents the group —A—Y, the Compound (II) represents iminodibenzyl, and the Compound (II) may be, for example, 1-chloro-3-[4-hydroxy-4-(3-trifluoromethylphenyl)piperidino]propane
1-chloro-3-[4-hydroxy-4-(4-trifluoromethylphenyl)piperidino]propane
1-chloro-3-(4-ethoxy-4-piperidinopiperidino)propane
1-methanesulfonyloxy-3-(4-carbamoyl-4-dimethylaminopiperidino)propane
1-chloro-2-methyl-3-(4-carbamoyl-4-morpholinopiperidino)propane
1-ethanesulfonyloxy-3-(4-acetamidomethyl-4-phenylpiperidino)propane
1-chloro-3-(4-carbamoyl-4-piperidinopiperidino)propane
1-chloro-3-(4-piperidinopiperidino)propane
1-chloro-3-[4-hydroxy-4-(4-chlorophenyl)piperidino]propane
1-chloro-3-[4-phenyl-4-(4-methylphenyl)piperidino]propane
1-benzensulfonyloxy-3-[4-phenyl-4-(4-methylphenyl)piperidino]propane
1-chloro-3-(4-phenyl-4-acetamidomethylpiperidino)propane
1-(4-toluenesulfonyloxy)-3-(4-phenyl-4-acetamidomethylpiperidino)propane The reaction is carried out with or without a solvent. When no solvent is used, the reaction is preferably carried out under elevated pressure. However, in most cases, it is preferable to employ a solvent. The solvent may, for example, be alcohol such as methanol, ethanol, propanol, isopropanol, butanol and isobutanol, ketone such as acetone, methyl ethyl ketone and cyclohexanone, aromatic hydrocarbon such as benzene, toluene and xylene, halogenated hydrocarbon such as chlorobenzene, chloroform and dichloroethane, ether such as tetrahydrofuran and dioxane, amine or amide such as pyridine, dimethylformamide and dimethylacetamide, or liquid ammonia.

It is generally preferable to conduct the reaction under heating at the neighbourhood of the boiling point of the solvent. Generally, a reaction time of from a few to several tens of hours is satisfactory. If desired, the reaction may be conducted in the presence of a basic substance such as alkali metal hydroxide (e.g. sodium hydroxide and potassium hydroxide), alkali metal carbonate (e.g. sodium carbonate and potassium carbonate), tertiary amine (e.g. pyridine and triethylamine), or alkali metal amide (e.g. lithium amide, sodium amide and potassium amide).

When an iminodibenzyl is used as the starting material, it is recommended to employ as the basic substance an alkali metal amide, where the starting material, iminodibenzyl, may be changed into the alkali metal salt prior to the reaction with the compound represented by the Formula III.

Thus produced compounds of the Formula I, which are novel and useful as the agents for the therapy of chronic schizophrenia, include, for example:

N-[3-(4-carbamoyl-4-piperidinopiperidino)propyl]iminodibenzyl,
N-[3-(4-carbamoyl-4-dimethylaminopiperidino)propyl]iminodibenzyl,
N-{3-[4-carbamoyl-4-(4-methylpiperadino)piperidino]propyl}iminodibenzyl,
N-[3-(4-carbamoyl-4-piperidinopiperidino)-2-methylpropyl]iminodibenzyl,
N-[3-(4-piperidinopiperidino)propyl]iminodibenzyl,
N-[3-(4-cyano-4-phenylpiperidino)propyl]iminodibenzyl,
N-[3-(4-carbamoyl-4-morpholinopiperidino)-2-methylpropyl]iminodibenzyl,
N-{3-[4-hydroxy-4-(4-chlorophenyl)piperidino]propyl}iminodibenzyl,
N-[3-(4-hydroxy-4-phenylpiperidino)propyl]iminodibenzyl,
N-{3-[4-hydroxy-4-(3-trifluoromethylphenyl)piperidino]propyl}iminodibenzyl,
N-{3-[4-hydroxy-4-(4-trifluoromethylphenyl)piperidino]propyl}iminodibenzyl,
N-{3-[4-hydroxy-4-(4-methylphenyl)piperidino]propyl}iminodibenzyl,
N-[3-(4-phenyl-4-acetylaminomethylpiperidino)propyl]iminodibenzyl,
N-{3-[4-methoxy-4-(4-chlorophenyl)piperidino]propyl}iminodibenzyl, as well as their salts formed with an acid, especially one selected from those pharmaceutically acceptable when the salts are to be used as a medicament, such as inorganic acid salts (e.g. hydrochloride, hydrobromide, nitrate and sulfate), organic acid salts (e.g. oxalate, maleate, tartrate, fumarate and tannate) or quaternary ammonium salts (e.g. iodomethylate, iodoethylate and methylsulfate).

The compounds represented by the Formula I thus produced are useful as therapeutic agents for psychosis, especially for chronic schizophrenia. Although it has generally been believed to be difficult to recover the patients suffering from chronic schizophrenia, administration of these compounds to such patients in an amount of about 150 to 250 milligrams per day causes a remarkable therapeutic effect on the patients; thus, for example, there are observed relief of autism, acceleration of will power, improvement of depressive state and activation of voluntary behavior; while the administration of these compound in an effective amount causes no harm to any of the body functions.

In general, anti-depressive agents hitherto-used clinically are known to antagonise the actions of reserpine and to potentiate cramp inducing action of monoamine oxidase inhibitor. The compounds of the invention antagonise the action of reserpine which causes, when administered, ptosis, hypothermic action, diarrhea and hypercrinism, for example. When administered to animals such as rats prior to the administration of convulsive or lethal dose of monoamine oxidase inhibitor such as phenylhydrazine, the compounds of the present invention exhibit an action to shorten the on-set time of cramp and the time to death due to the monoamine oxidase inhibitor. Therefore, this action suggests that the compounds have a desirable stimulating effect.

Acute toxicity observed in intraperitoneal administration of these compounds to mice is about 134 milligrams per kilogram of the body weight in terms of $LD_{50}$. There is no substantial change in respiration and blood pressure. Therefore, the compounds provide novel pharmaceuticals which can be safely administered and are useful as therapeutic agents for the therapy of patients suffering from chronic schizophrenia.

When actually administered as a medicine, the iminodibenzyl compounds or their salts may be taken per se or as a suitable preparation depending on the condition of the patient. As these compounds of the present invention are chemically stable, they can be processed into a desired preparation after the per se known manner. An example of the preparation for the purpose is shown as follows:

Tablets (per tablet): Milligrams
N-[3-(4-carbamoyl-4-piperidinopiperidino)
propyl]iminodibenzyl _____ 25.0
Lactose _____ 54.0
Starch _____ 15.0
Carboxymethylcellulose (sodium salt) _____ 2.0
Talc _____ 26.0
Magnesium stearate _____ 1.0
Refined sucrose _____ 73.5
Acacia _____ 2.2
Calcium carbonate _____ 11.2
Bees wax _____ 0.1

Total _____ 210.0

Tablets so-prepared may further be coated with sugar.

The following examples of presently-preferred embodiments are solely for the purpose of illustration and are not to be construed as limitations of this invention, many variations being possible without departing from the spirit or scope of this invention. In these examples, temperatures are all in degrees centigrade and uncorrected; percentages are on the weight basis; and abbreviations g., cm. and cc. should be read as gram(s), centimeter(s) and cubic centimeter(s), respectively.

Example 1

In 50 cc. of benzene are dissolved 2.7 g. of N-(3-chloropropyl)-iminodibenzyl and 2.1 g. of 4-hydroxy-4-(4-chlorophenyl)piperidine, followed by the addition of 3 g. of potassium carbonate. The mixture is heated under reflux on water bath for 40 hours. After cooling, the reaction mixture is filtered. The filtrate is washed with water and dried over anhydrous potassium carbonate, and the benzene is distilled off. The oily residue is dissolved in ether, and hydrogen chloride gas is introduced into the solution to obtain N-{3-[4-(4-chlorophenyl)-4-hydroxypiperidino]propyl}iminodibenzyl hydrochloride as white crystals containing 0.5 molecule of crystal water, which melt at 124–136°.

Elementary analysis.—Calculated: C, 68.27%; H, 6.75%; N, 5.69%. Found: C, 67.93%; H, 6.30%; N, 5.74%.

Example 2

In 50 cc. of ethanol are dissolved 2.7 g. of N-(3-chloropropyl)-iminodibenzyl and 2.3 g. of 4-acetamidomethyl-4-phenylpiperidine, followed by the addition of 3.0 g. of potassium carbonate. The mixture is heated under reflux on water bath for 40 hours. After the reaction, ethanol is distilled off. Water is added to the oily residue and the aqueous solution is then extracted with benzene. After drying with potassium carbonate, the benzene layer is allowed to pass through a column (15 cm. in height, 1 cm. in diameter) packed with activated alumina, and then eluated with about 1 liter of benzene. Resulting benzene layers are collected and concentrated. The oily residue is dissolved in ether, and hydrogen chloride gas is introduced into the solution to obtain N-[3-(4-phenyl-4-acetamidomethylpiperidino)propyl]iminodibenzyl hydrochloride as crystals containing 0.5 molecule of crystal water and having the melting point of 75–80°.

Elementary analysis.—Calculated: C, 72.56%; H, 7.66%; N, 8.19%. Found: C, 72.65%; H, 7.57%; N, 7.84%.

Example 3

Sodium amide, prepared from 1.1 g. of metallic sodium, is allowed to react with 10 g. of iminodibenzyl in liquid ammonia. Then, the ammonia is evaporated and xylene is added to the residue. To the xylene solution is added dropwise 17 g. of 1-chloro-3-(4-acetamidomethyl-4-phenylpiperidino)propane in the course of 1 hour, while maintaining the solution at 130–140° on an oil bath. Then, the mixture is maintained at the same temperature further for 1 hour. After cooling, the xylene layer is washed with water, dried over potassium carbonate, and xylene is distilled off. The so-obtained oily residue is treated in the same manner as in Example 2 to give N-[3-(4-phenyl-4 - acetamidomethylpiperidino)propyl]iminodibenzyl hydrochloride as crystals containing 0.5 molecule of crystal water, which melt at 80–85°.

Example 4

Sodium amide, prepared from 1.1 g. of metallic sodium, is allowed to react with 10 g. of iminodibenzyl in liquid ammonia. The ammonia is evaporated and xylene is added to the residue. To the xylene solution is added 16.5 g. of 1-chloro-3-[4-hydroxy-4 - (3 - trifluoromethylphenyl)piperidino]propane in the course of 1 hour, while maintaining the solution at 130–140°. Then, the mixture is maintained at the same temperature further for 1 hour. After cooling, the reaction mixture is washed with water, dried over potassium carbonate, and the xylene is distilled off. The so-obtained oily residue is treated in the same manner as in Example 2 to give crystals of N-{3-[4-hydroxy - 4 - (4 - trifluoromethylphenyl)piperidino]propyl} iminodibenzyl hydrochloride. Recrystallization of the crystals from a mixture of methanol and ether gives a product containing 0.5 molecule of crystal methanol and melting at 112–114°.

Elementary analysis.—Calculated: C, 66.46%; H, 6.30%; N, 5.25%. Found: C, 66.57%; H, 6.33%; N, 5.28%.

Example 5

In 50 cc. of ethanol are dissolved 2.1 g. of N-(3-chloropropyl)-iminodibenzyl and 2.7 g. of 4-hydroxy-4-(3-trifluoromethylphenyl)piperidine, followed by the addition of 3.0 g. of potassium carbonate. The mixture is heated under reflux for 40 hours. After the reaction, ethanol is distilled off. Water is added to the residue, and the aqueous mixture is then subjected to extraction with benzene. After being dried with potassium carbonate, the benzene layer is allowed to pass through a column (15 cm. in height, 1 cm. in diameter) packed with activated alumina, and is eluted with 1 liter of benzene. The benzene layers are colletced and concentrated to leave an oily residue. The oily residue is dissolved in ether, and hydrogen chloride gas is introduced into the solution to obtain N-{3-[4-hydroxy-4-(3 - trifluoromethylphenyl)piperidino]propyl}iminodibenzyl hydrochloride. Recrystallization of the product from a mixture of methanol and ether yields crystals with 0.5 molecule of crystal methanol which melts at 112–114°.

Example 6

In 50 cc. of ethanol are dissolved 2.7 g. of N-(3-chloropropyl)iminodibenzyl and 2 g. of 4-piperidinopiperidine, followed by the addition of 3 g. of potassium carbonate. After the mixture is heated under reflux on water bath for 40 hours, ethanol is distilled off, and 50 cc. of water is added to the residue. The aqueous solution is extracted with benzene. The benzene layer is washed with water, and then dried over potassium carbonate. The benzene layer is allowed to pass through a column (1.5 cm. in diameter, 15 cm. in length) packed with activated alumina, is eluted with about 1 liter of benzene and the eluate is concentrated. The oily residue is dissolved in ether, and hydrogen chloride gas is introduced into the solution to yield 2.5 g. of N-[3-(4-piperidinopiperidino)propyl]iminodibenzyl dihydrochloride, which melts at 300° with decomposition.

Elementary analysis.—Calculated: C, 68.04%; H, 8.25%; N, 8.82%. Found: C, 68.16%; H, 8.09%; N, 8.67%.

Example 7

In 50 cc. of ethanol are dissolved 2.7 g. of N-(3-chloropropyl)iminodibenzyl and 2.2 g. of 4-carbamoyl-4-piperidinopiperidine, followed by the addition of 3 g. of potassium carbonate. After the mixture is heated under reflux on water bath for 40 hours, ethanol is distilled off, and then 50 cc. of water is added to the residue. The aqueous solution is subjected to extraction with benzene and the benzene layer is allowed to pass through a column packed with 100 g. of activated alumina, is eluted with 1 liter of benzene and the eluate is concentrated. The oily residue is dissolved in ether and hydrogen chloride gas is introduced into the solution to separate crystals. These crystals are recrystallized from a mixture of methanol and ether to give 3.0 g. of crystals of N-[3-(4-carbamoyl-4-piperidinopiperidino)propyl]-iminodibenzyl dihydrochloride with 1 molecule of crystal methanol, melting at 278–279°.

Elementary anaylsis.—Calculated: C, 63.13%; H, 8.04%; N, 10.16%. Found: C, 62.78%; H, 7.92%; N, 10.19%.

Example 8

The same procedure as in Example 7, except the use of 1.6 g. of 4-carbamoyl-4-dimethylaminopiperidine instead of 4-carbamoyl-4-piperidinopiperidine affords N-[3-(4 - carbamoyl - 4 - dimethylaminopiperidino)propyl]-iminodibenzyl dihydrochloride which melts at 265–267° with decomposition.

Elementary analysis.—Calculated: C, 62.61%; H, 7.57%; N, 11.68%. Found: C, 62.43%; H, 7.82% N, 11.58%.

Example 9

Sodium amide, prepared from 2.5 g. of metallic sodium, is allowed to react with 19.5 g. of iminodibenzyl in liquid ammonia. Then, the ammonia is evaporated and xylene is added to the residue. To the xylene solution is added dropwise 26.8 g. of 1-chloro-3-(4-carbamoyl-4-piperidinopiperidino)propane at 130–140° in the course of 1 hour. The mixture is stirred at the same temperature further for 1 hour. After cooling, the xylene layer is washed with water, dried with potassium carbonate, and the xylene is distilled off. The oily residue is allowed to pass through a column (3 cm. in diameter, 20 cm. in length) packed with activated alumina, is then eluted with benzene and the eluate is concentrated. So-refined oily residue is dissolved in ether and treated with hydrogen chloride to separate crystals. These crystals are recrystallized from a mixture of methanol and ether to give crystals of N-[3-(4 - carbamoyl - 4 - piperidinopiperidino)propyl]iminodibenzyl dihydrochloride with 1 molecule of crystal methanol, melting at 278–279°.

Example 10

The same procedure as in Example 9, except employing 1-chloro-3-(4-carbamoyl-4-dimethylaminopiperidino)propane instead of 1-chloro-3-(4-carbamoyl-4-piperidinopiperidino)propane affords N-[3-(4-carbamoyl-4-dimethylaminopiperidino)propyl]iminodibenzyl dihydrochloride, which melts at 265–267°.

Having thus disclosed the invention, what is claimed is:

1. A psychotherapeutic composition, which comprises, as active ingredient, a minor but therapeutically effective proportion of at least one member selected from the class consisting of compounds of the formula

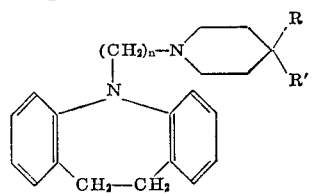

and therapeutically acceptable acid addition salts thereof, wherein $n$ is an integer from 1 to 4 inclusive, R is a member selected from the group consisting of H, hydroxyl, alkoxy having up to 5 carbon atoms, cyano, carbamoyl, aminomethyl and acylaminomethyl where the acyl is a carboxylic acid acyl having up to 7 carbon atoms, and R' represents a member selected from the group consisting of phenyl, halophenyl, tolyl, halomethylphenyl and

where each of Q and Q' independently is alkyl having up to 6 carbon atoms and Q and Q', taken together with the adjacent nitrogen atom, are a five- to six-membered heterocyclic radical, and a major proportion of therapeutically acceptable carrier therefor, said composition being in tablet form.

2. The composition as claimed in claim 1, wherein the active compound is in an acid addition salt form.
3. The composition as claimed in claim 1, wherein the active compound is in the hydrochloride form.
4. The composition as claimed in claim 1, wherein the active compound is N[3-(4-carbamoyl-4-piperidinopiperidino)propyl] iminodibenzyl.
5. The composition as claimed in claim 1, wherein the active compound is in the dihydrochloride form.

References Cited

UNITED STATES PATENTS

| | | | |
|---|---|---|---|
| 2,976,281 | 3/1961 | Schindler | 260—294.7 |
| 3,083,205 | 3/1963 | Janssen | 260—294 |
| 3,102,888 | 9/1963 | Jacob et al. | 260—294.3 |
| 3,123,610 | 3/1964 | Cusic | 260—294 |
| 3,130,192 | 4/1964 | Schindler | 260—294 |
| 3,183,235 | 5/1965 | Zenitz | 260—294 |
| 3,209,006 | 9/1965 | Wragg et al. | 260—294 |

OTHER REFERENCES

Stedman's Medical Dictionary: 21st Ed. (1966), pp. 1424–1425.

ALBERT T. MEYERS, *Primary Examiner.*

S. FRIEDMAN, *Assistant Examiner.*